United States Patent
Vasseur et al.

(10) Patent No.: US 9,185,022 B2
(45) Date of Patent: Nov. 10, 2015

(54) DYNAMICALLY TRIGGERED TRAFFIC ENGINEERING ROUTING ADVERTISEMENTS IN STATEFUL PATH COMPUTATION ELEMENT ENVIRONMENTS

(75) Inventors: Jean-Philippe Vasseur, Saint Martin d'Uriage (FR); Stefano Previdi, Rome (IT); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 279 days.

(21) Appl. No.: 13/524,769

(22) Filed: Jun. 15, 2012

(65) Prior Publication Data
US 2013/0336107 A1    Dec. 19, 2013

(51) Int. Cl.
| | | |
|---|---|---|
| H04L 12/24 | (2006.01) | |
| H04J 3/14 | (2006.01) | |
| H04L 12/759 | (2013.01) | |
| H04L 12/915 | (2013.01) | |
| H04L 12/911 | (2013.01) | |
| H04L 12/721 | (2013.01) | |
| H04L 12/717 | (2013.01) | |

(52) U.S. Cl.
CPC .......... *H04L 45/028* (2013.01); *H04L 41/0654* (2013.01); *H04L 45/42* (2013.01); *H04L 45/44* (2013.01); *H04L 47/785* (2013.01); *H04L 47/825* (2013.01)

(58) Field of Classification Search
USPC .......................................... 370/235, 229, 230
See application file for complete search history.

(56) References Cited

U.S. PATENT DOCUMENTS

| | | | |
|---|---|---|---|
| 6,665,273 B1 * | 12/2003 | Goguen et al. ................. | 370/252 |
| 7,031,262 B2 | 4/2006 | Vasseur et al. | |
| 7,551,569 B2 | 6/2009 | Vasseur | |
| 7,623,461 B2 * | 11/2009 | Vasseur et al. ................. | 370/238 |
| 7,660,254 B2 | 2/2010 | Vasseur et al. | |
| 7,668,971 B2 | 2/2010 | Vasseur et al. | |
| 7,801,137 B2 | 9/2010 | Vasseur et al. | |
| 7,886,079 B2 | 2/2011 | Vasseur et al. | |
| 7,986,618 B2 | 7/2011 | Charny et al. | |
| 7,995,500 B2 | 8/2011 | Vasseur | |

(Continued)

FOREIGN PATENT DOCUMENTS

WO    WO-2009049668 A1    4/2009

OTHER PUBLICATIONS

Crabbe, et al., "PCEP Extensions for Stateful PCE", IETF Trust, Network Working Group, Internet Draft, draft-ietf-pce-stateful-pce-00, Feb. 2012, 52 pages.

(Continued)

*Primary Examiner* — Edan Orgad
*Assistant Examiner* — Sithu Ko
(74) *Attorney, Agent, or Firm* — Parker Ibrahim & Berg LLC; James M. Behmke; Kenneth J. Heywood (57) ABSTRACT

In one embodiment, a device (e.g., a path computation element, PCE) monitors a tunnel set-up failure rate within a computer network, and determines whether to adjust an accuracy of routing information based on the tunnel set-up failure rate. For instance, the tunnel set-up failure rate being above a first threshold indicates a need for greater accuracy. In response to the tunnel set-up failure rate being above the first threshold, the device may then instruct one or more routers to shorten their routing update interval in the computer network.

20 Claims, 10 Drawing Sheets

(56) References Cited

U.S. PATENT DOCUMENTS

| | | | |
|---|---|---|---|
| 8,199,642 B2 | 6/2012 | Vasseur et al. | |
| 8,279,749 B2 | 10/2012 | Vasseur et al. | |
| 8,355,315 B2 | 1/2013 | Vasseur et al. | |
| 8,363,571 B2 | 1/2013 | Vasseur et al. | |
| 8,369,213 B2 | 2/2013 | Vasseur et al. | |
| 2005/0259664 A1 | 11/2005 | Vasseur et al. | |
| 2006/0291391 A1* | 12/2006 | Vasseur et al. | 370/235 |
| 2007/0133406 A1 | 6/2007 | Vasseur | |
| 2007/0183317 A1* | 8/2007 | Vasseur et al. | 370/225 |
| 2009/0225652 A1 | 9/2009 | Vasseur et al. | |
| 2011/0153829 A1* | 6/2011 | Kwon et al. | 709/226 |

OTHER PUBLICATIONS

Farrel, et al., "A Path Computation Element (PCE)-Based Architecture", The Internet Society, Network Working Group, Request for Comments 4655, Aug. 2006, 41 pages.

Pan, et al., "Fast Reroute Extensions to RSVP-TE for LSP Tunnels", The Internet Society, Network Working Group, Request for Comments 4090, May 2005, 39 pages.

Vasseur, et al., "Path Computation Element (PCE) Communication Protocol (PCEP)", IETF Trust, Network Working Group, Request for Comments 5440, Mar. 2009, 87 pages.

Lampreia, et al., "Invitation to Pay Additional Fees and, Where Applicable, Protest Fee", Patent Cooperation Treaty, International Application No. PCT/US2013/045894, mailed Oct. 16, 2013, 8 pages, European Patent Office, Rijswijk, Netherlands.

Zhang, et al., "Research and Design of Redundant Cluster-Head Model in WIA-PA Based on Adaptive Heartbeat Protocol", International Conference on Computational Intelligence and Software Engineering, Dec. 2009, 4 pages, Institute of Electrical and Electronics Engineers, Piscataway, New Jersey.

* cited by examiner

DYNAMICALLY TRIGGERED TRAFFIC ENGINEERING ROUTING ADVERTISEMENTS IN STATEFUL PATH COMPUTATION ELEMENT ENVIRONMENTS

TECHNICAL FIELD

The present disclosure relates generally to computer networks, and, more particularly, to path computation elements (PCEs).

BACKGROUND

Tunnels have been used for a number of applications such as the support of virtual private networks (VPNs) or Traffic Engineering following source routed paths hop-by-hop. Among the number of tunneling techniques developed over the past decade, multiprotocol label switching (MPLS) Traffic Engineering (TE) has been widely deployed by service providers and large enterprise networks in order to optimize the to network resource in light of specified traffic demand (traffic engineering) or in support of fast restoration of traffic in case of link and/or node failures thanks to local protection techniques as MPLS TE Fast Reroute that rely on local reroute upon fast detection of a network element failure.

Path computation elements (PCEs), as defined, for example, in the Internet Engineering Task Force's Request for Comment (RFC) 4655, generally consist of relying on an external engine (PCE) responsible for the computation of tunnels in the network. Head-ends (or Path Computation Clients—PCCs) send requests to PCEs (PCReq messages) using the PCEP signaling protocol (RFC 5440), and receive computed paths thanks to replies (PCRep messages). PCEP also specifies notification and error messages. PCEs have been used mostly for back-up tunnel path computation and inter-domain (Inter-area/AS) path computations where per-domain path computation was the only (potentially very sub-optimal) technique available prior to the PCE.

PCE-based networks deployed so far have been stateless. That is, tunnels were computed by the PCE according to the Traffic Engineering Database (TED) fed in most cases by the routing protocol without requiring any state maintenance. However, for certain applications, stateful PCE may provide a more optimal solution. A new stateful PCE draft has been adopted as an IETF Working Document, entitled "PCEP Extensions for Stateful PCE" <draft-ietf-pce-stateful-pce> by Crabbe et al., and which specifies several new PCEP messages, allowing PCCs to update the PCE on their tunnel states (PCRpt messages), control tunnel delegation (ability for the PCE to remotely control a tunnel) and for the PCE to send tunnel requests to PCCs to learn states (PCUpd messages). Stateful PCE architectures, however, still present a number of challenges of various natures.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device (e.g., a path computation element, PCE) monitors a tunnel set-up failure rate within a computer network, and determines whether to adjust an accuracy of routing information based on the tunnel set-up failure rate. For instance, the tunnel set-up failure rate being above a first threshold indicates a need for greater accuracy. In response to the tunnel set-up failure rate being above the first threshold, the device may then instruct one or more routers to shorten their routing update interval in the computer network.

According to one or more additional embodiments of the disclosure, a particular router determines a tunnel set-up failure rate at the particular router, and transmits a notification of the tunnel set-up failure rate toward a path computation element (PCE) in the computer network, the notification having an identifier (ID) of a link associated with the tunnel set-up failure rate and an amount of resources the failed tunnel requested above available resources of the link. The particular router may then receive instructions to shorten a routing update interval at the particular router based on the tunnel set-up failure rate, and then transmits routing updates based on the received instructions.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain" and a router used to interconnect multiple domains is generally referred to as a "border router" or BR. In the case of areas rather than ASes since the routers are under a common authority, a single router may in fact serve as an exit border router of one area and an entry border router of another area.

Figure 1A:
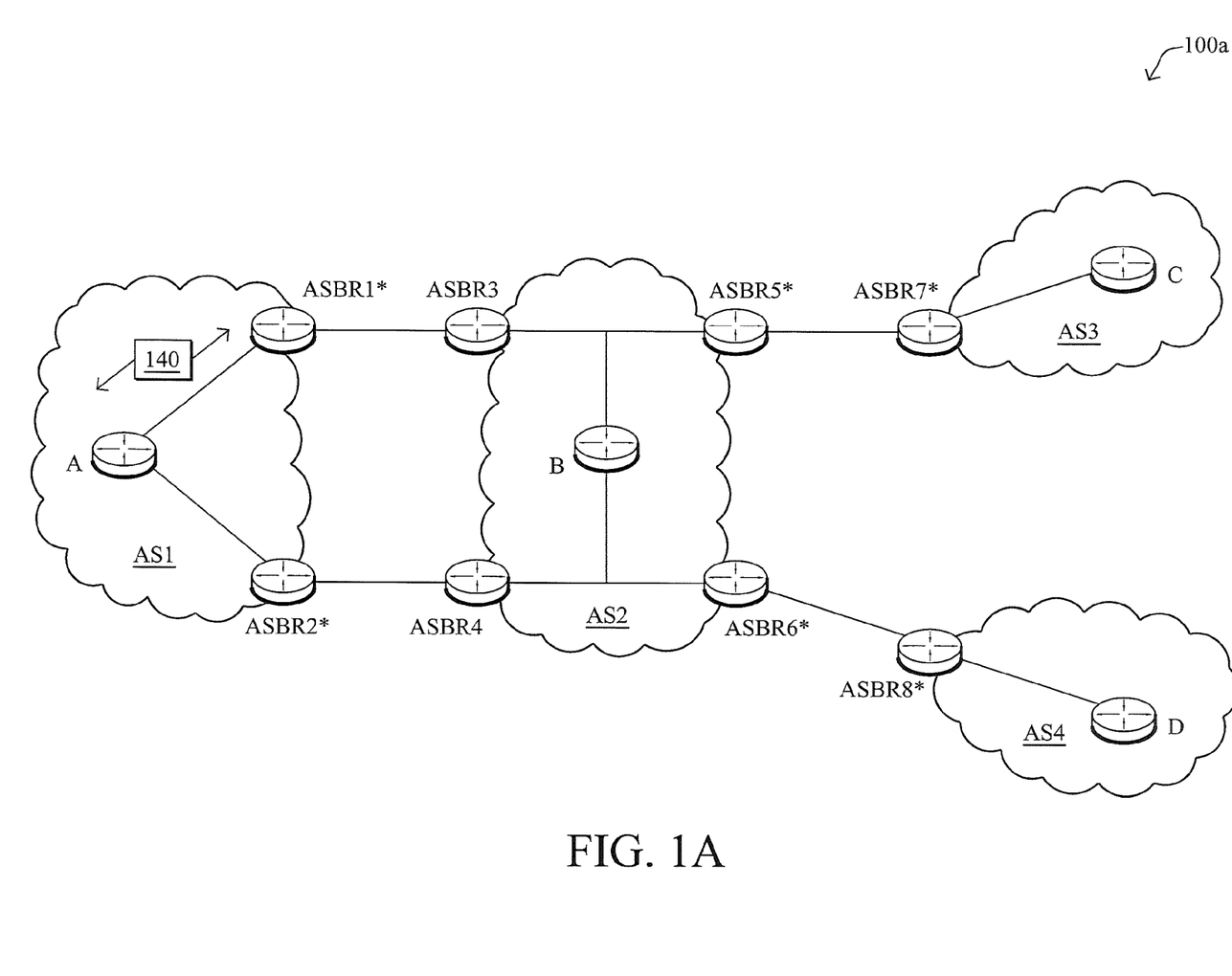
FIGS. 1A-1B illustrate example computer networks.

FIG. 1A is a schematic block diagram of an exemplary computer network 100a comprising autonomous system AS2, which is interconnected with a plurality of other autonomous systems AS1, AS3, and AS4. An Autonomous System (AS) is herein defined to be a group of intermediate nodes, such as intradomain routers, within a network that are subject to a common authority and execute one or more intradomain routing protocols. Although, each AS is illustratively an autonomous system, those skilled in the art will appreciate that the ASes may alternatively be configured as routing domains or other networks or subnetworks. The autonomous system AS1 includes intradomain routers such as border routers ASBR1* and ASBR2* through which communication, such as data packets, may pass into and out of the autonomous system to border routers ASBR3 and ASBR4, respectively of AS2. AS2 also includes border routers ASBR5* and ASBR6* in communication with border routers ASBR7* and ASBR8* of ASes 3 and 4, respectively. Moreover, within AS1, AS2, AS3, and AS4, there are exemplary intradomain routers A, B, C, and D, respectively.

Figure 1B:
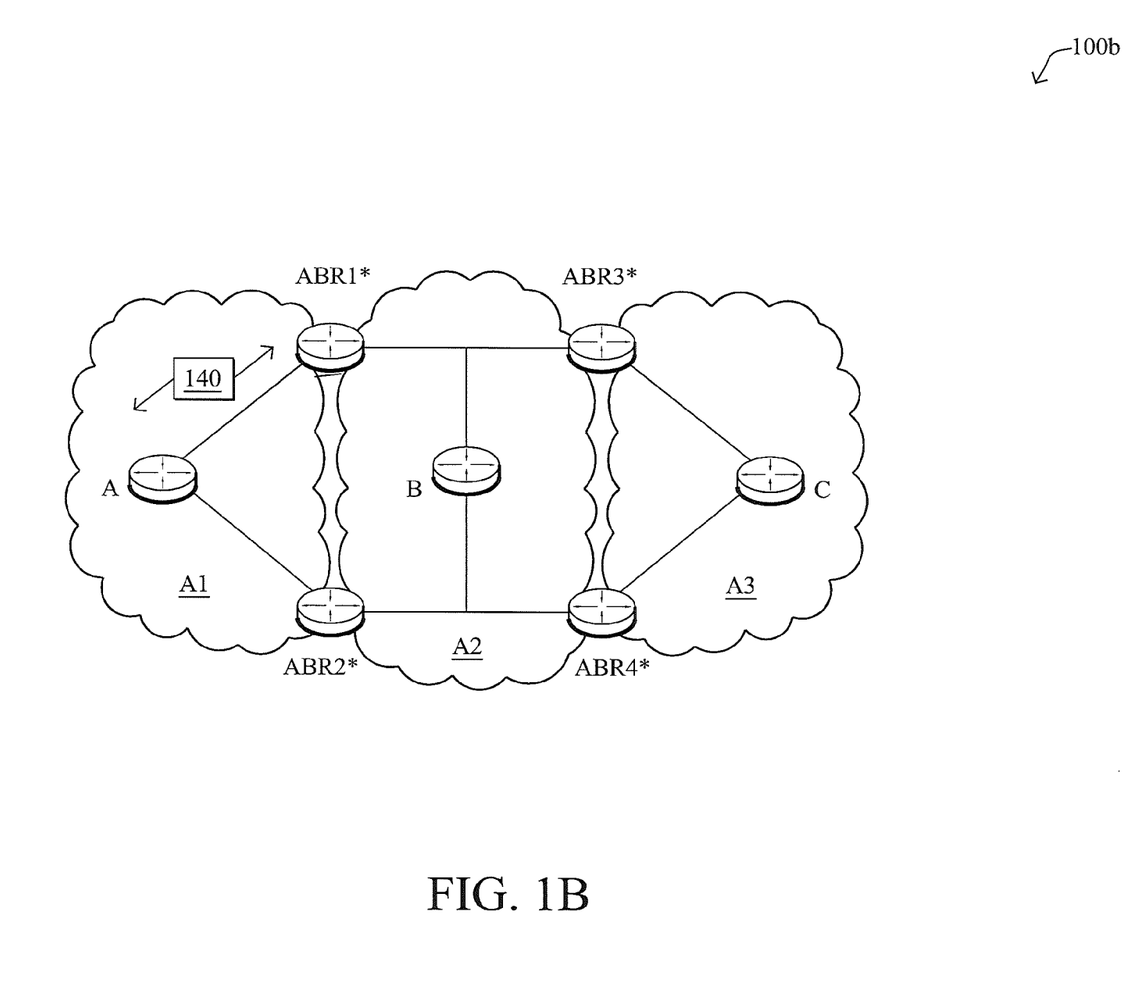

Alternatively or in addition, FIG. 1B is a schematic block diagram of an exemplary computer network 100b comprising areas A1, A2, and A3, each having at least one intradomain router, A, B, and C, respectively. In particular, A1 and A2 share border routers ABR1* and ABR2*, while A2 and A3 share ABR3* and ABR4. As used herein, an area is a collection of routers that share full network topology information with each other but not necessarily with routers outside the area. The term area as used herein also encompasses the term "level" which has a similar meaning for networks based on their chosen routing protocol.

Data packets 140 (e.g., discrete frames or packets of data) may be exchanged among the nodes/devices of the computer network 100 (100a and 100b, generically) using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. In this context, a protocol consists of a set of rules defining how the nodes interact with each other. For example, in addition to user data, routing information may be distributed among the routers within an AS (e.g., between areas A1-A3) using pre-determined "interior" gateway protocols (IGPs), such as conventional distance-vector protocols or, illustratively, link-state protocols, through the use of link-state advertisements (LSAs) or link-state packets. Moreover, data packets containing network routing information may be exchanged among the autonomous systems AS1-AS4 using "external" gateway protocols, such as the Border Gateway Protocol (BGP).

Those skilled in the art will understand that any number of nodes, devices, links, etc. may be used in the computer network, and that the view shown herein is for simplicity. Furthermore, the techniques described below with reference to inter-AS path computation may be used in the context of inter-area path computation and, under certain conditions, the techniques described with reference to inter-area path computation may be used for inter-AS path computation.

Figure 2:
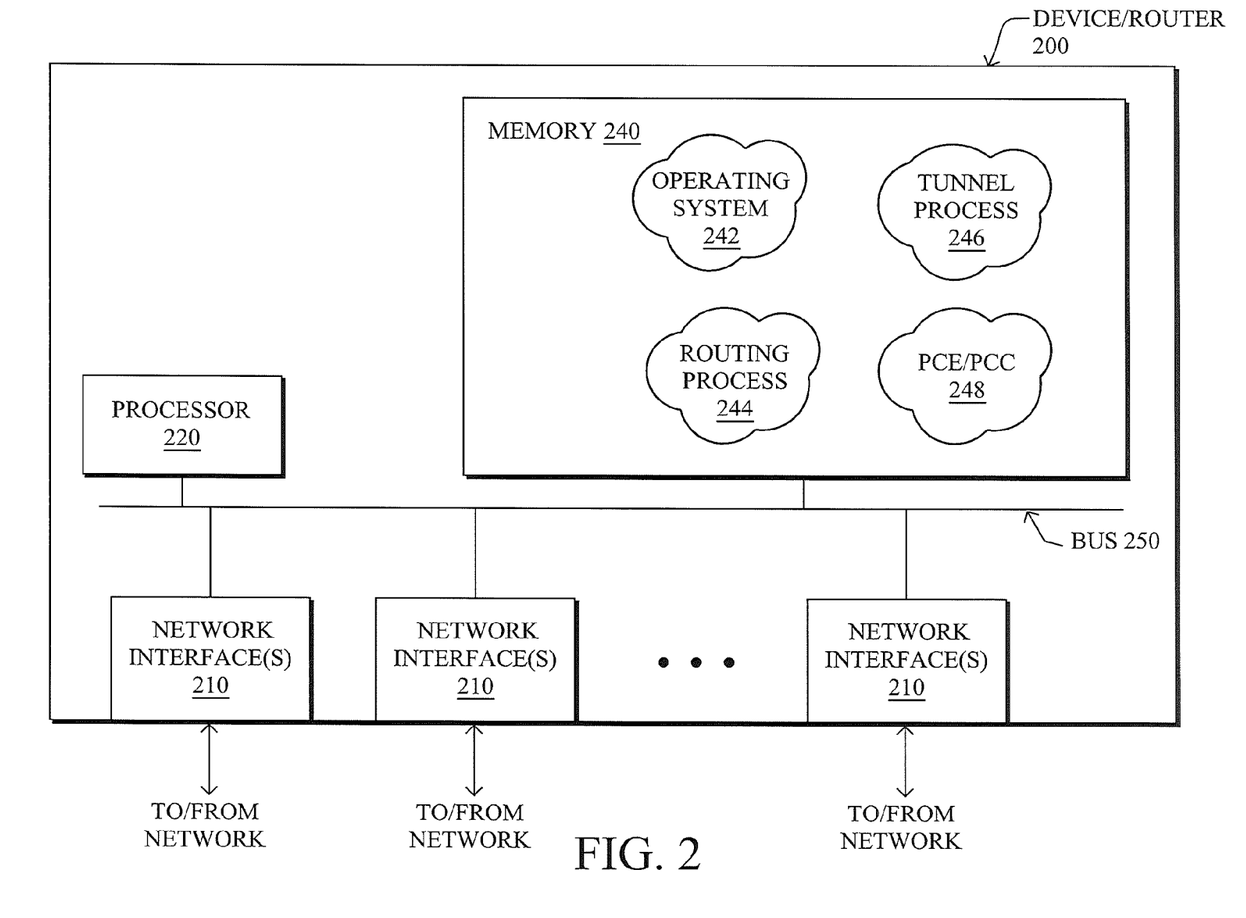
FIG. 2 illustrates an example network device/node.

FIG. 2 is a schematic block diagram of an example node/device (e.g., router) 200 that may be used with one or more embodiments described herein, e.g., as any of the devices in FIGS. 1A and 1B above, particularly as a path computation element or client (PCE or PCC) described herein. The device may comprise one or more network interfaces 210, at least one processor 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245, such as routing databases/link state databases (LSDBs)/Traffic Engineering databases (TEDs) and or tables. An operating system 242, portions of which are typically resident in memory 240 and executed by the processor, functionally organizes the device by, among other things, invoking operations in support of software processes and/or services executing on the device. These software processes and/or services may comprise routing process/services 244, tunneling process/services 246, and an illustrative PCE/PCC process 248, as described herein. Note that while the processes are shown in centralized memory 240, alternative embodiments provide for certain aspects of the techniques herein to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as the Interior Gateway Protocol (IGP) (e.g., Open Shortest Path First, "OSPF," and Intermediate-System-to-Intermediate-System, "IS-IS") as IGP services, the Border Gateway Protocol (BGP), etc., as will be understood by those skilled in the art. These functions may be configured to manage routing and forwarding information databases/tables (data structures 245) containing, e.g., data used to make routing and forwarding decisions. Notably, routing services 244 may also perform functions related to virtual routing protocols, such as maintaining virtual routing/forwarding (VRF) instances (illustratively a component of tables 245) as will be understood by those skilled in the art.

Changes in the network topology within the local domain (network 100) may be communicated among nodes/routers 200 within the network 100 using routing services 244, for example, IGP services such as the conventional OSPF and IS-IS link-state protocols. Suppose, for example, that a communication link fails or a cost value associated with a network node changes. Once the change in the network's state is detected by one of the routers, that router may flood an IGP (or BGP) advertisement (message/packet 140) communicating the change to the other routers in the network. In this manner, each of the routers eventually "converges" to an identical view of the network topology.

Multi-Protocol Label Switching (MPLS) is a known protocol in which a path for a source-destination pair may be established along label switched routers (LSRs), and values required for forwarding a packet between adjacent LSRs in the path together with headers or "labels" are prepended to the packet. The labels are used to direct the packet to the correct interface and "next hop" router. The labels precede any IP or other headers allowing use of smaller outer headers for the packet. The path for the source-destination pair, termed a Label Switched Path (LSP), can be established according to various different approaches. One such approach is Label Distribution Protocol (LDP) in which each router in the path sends its label to neighbor routers according to its IP routing table. LDP labels are sent to the neighbor routers in a label mapping message which can include as one of its TLV (Type Length Value) fields a path vector specifying the LSP. For each LSP created, a forwarding equivalent class (FEC) is associated with the path specifying which packets are mapped to the path. A Label Forwarding Information Base (LFIB) (data structure 245) stores the FEC, the next-hop information for the LSP, and the label required by the next hop.

Also, MPLS Traffic Engineering (TE) has been developed to meet data networking requirements such as guaranteed available bandwidth or fast reroute (FRR). MPLS TE exploits modem label switching techniques to build end-to-end tunnels based on a series of constraints through an IP/MPLS network of LSRs. These tunnels are a type of label switched path (LSP) and thus are generally referred to as MPLS TE-LSPs.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing or would otherwise traverse in a less efficient manner. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, among others, the Layer Two Tunnel Protocol (L2TP), the Point-to-Point Tunneling Protocol (PPTP), LP tunnels, and generic routing encapsulation (GRE) tunnels.

In particular, establishment of a tunnel (e.g., TE-LSP) requires computation of a path between a head-end node (LSR) to a tail-end node, signaling along the path (e.g., through resource reservation protocol (RSVP)-TE), and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. In addition, a number of techniques have been developed to allow for dynamic bandwidth adjustment of the signaled bandwidth using RSVP-TE, the allocation of dynamic preemptions so as to mitigate the probability of dead-lock due to bin-packing issues or bandwidth fragmentation, distributed re-optimization techniques to defragment to bandwidth in the network, distributed techniques for backup tunnel computation maximizing back-up bandwidth usage according to the assumption of single link/node/SRLG resources (bandwidth sharing between independent resources), etc.

Occasionally, a network element (e.g., a node or link) will fail, causing redirection of the traffic that originally traversed the failed network element to other network elements that bypass the failure. Generally, notice of this failure is relayed to the nodes in the network through an advertisement of the new network topology, e.g., an IGP or BGP Advertisement, and routing tables are updated to avoid the failure accordingly. Reconfiguring a network in response to a network element failure using, e.g., pure IP rerouting, can be time consuming. Many recovery techniques, however, are available to provide fast recovery and/or network configuration in the event of a network element failure, such as Fast Reroute, e.g., MPLS TE Fast Reroute (RFC4090).

Fast Reroute (FRR) has been widely deployed to protect against network element failures, where "backup tunnels" are created to bypass one or more protected network elements (e.g., links, shared risk link groups (SRLGs), and nodes). When the network element fails, traffic is quickly diverted ("Fast Rerouted") over a backup tunnel to bypass the failed element, or more particularly, in the case of MPLS, a set of primary TE-LSPs (tunnels) is quickly diverted. Specifically, the point of local repair (PLR) node configured to reroute the traffic inserts ("pushes") a new label for the backup tunnel, and the traffic is diverted accordingly. Once the failed element is bypassed, the backup tunnel label is removed ("popped") by the last LSR along the backup path, and the traffic is routed along the original path according to the next label (e.g., that of the original TE-LSP). Notably, the backup tunnel, in addition to bypassing the failed element along a protected primary TE-LSP, also intersects the primary TE-LSP, i.e., it begins and ends at nodes along the protected primary TE-LSP.

As noted above, tunnels have been used for a number of applications such as the support of virtual private networks (VPNs) or Traffic Engineering following source routed paths hop-by-hop. Among the number of tunneling techniques developed over the past decade, MPLS TE has been widely deployed by service providers and large enterprise networks in order to optimize the network resource in light of specified traffic demand (traffic engineering) or in support of fast restoration of traffic in case of link and/or node failures thanks to local protection techniques as MPLS TE Fast Reroute that rely on local reroute upon fast detection of a network element failure. MPLS TE-LSPs, for example, were originally computed using distributed constrained shortest path first (CSPF) algorithms where each tunnel head-end was responsible for the computation of the LSP path in the network, using a constrained SPF (e.g., Dijsktra) according to the Traffic Engineering Database (TED) distributed by a link state routing protocol such as OSPF or IS-IS.

A series of challenging problems arose that required the use of a new path computation model known as the Path Computation Element (PCE) model, such as defined in RFC4655. The PCE model generally consists of relying on an external engine (PCE) responsible for the computation of tunnels in the network. Head-ends (or Path Computation Clients—PCCs) send requests to PCEs (PCReq messages) using the PCEP signaling protocol (RFC5440), and receive computed paths thanks to replies (PCRep messages). PCEs have been used mostly for back-up tunnel path computation and inter-domain (Inter-area/AS) path computations where per-domain path computation was the only (potentially very suboptimal) technique available prior to the PCE.

In particular, the PCE is an entity having the capability to compute paths between any nodes of which the PCE is aware in an AS or area (domain). (PCE process/services 248 contain computer executable instructions executed by processor 220 to perform functions related to PCEs in general, and in accordance with one or more embodiments described herein.) PCEs are especially useful in that they are more cognizant of network traffic and path selection within their AS or area, and thus may be used for more optimal path computation. A head-end node/LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. PCEs conventionally have limited or no visibility outside of their surrounding area(s), level(s), or AS. A PCC can be informed of a PCE either by pre-configuration by an administrator, or by a PCE Discovery (PCED) message ("advertisement") carried within a routing protocol message, which is sent from the PCE within its area or level or across the entire AS to advertise its services.

Generally, PCE functions are hosted on a BR between domains for inter-domain path computation, and there are typically at least two BRs, so there is no single point of failure. For example, ASBRs and ABRs tagged with an asterisk (*) in FIGS. 1A and 1B may be configured as PCEs. Note that while illustratively PCE functions are generally hosted on a BR, the techniques described herein are equally applicable to PCEs not hosted on a BR, accordingly.

Figure 3A:
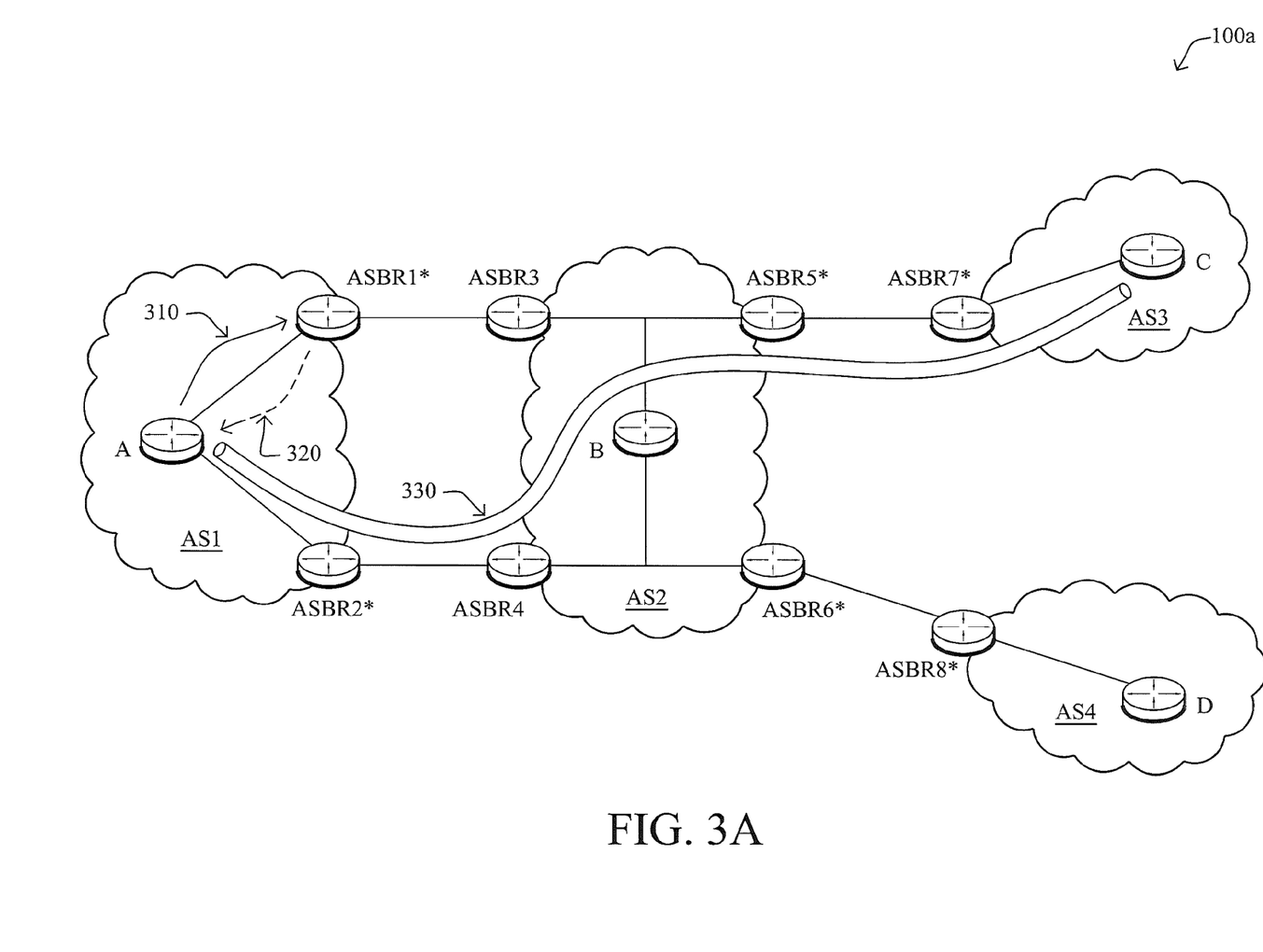
FIGS. 3A-3B illustrate examples of PCE-based tunnel computation in the networks of FIGS. 1A-1B.
Figure 3B:
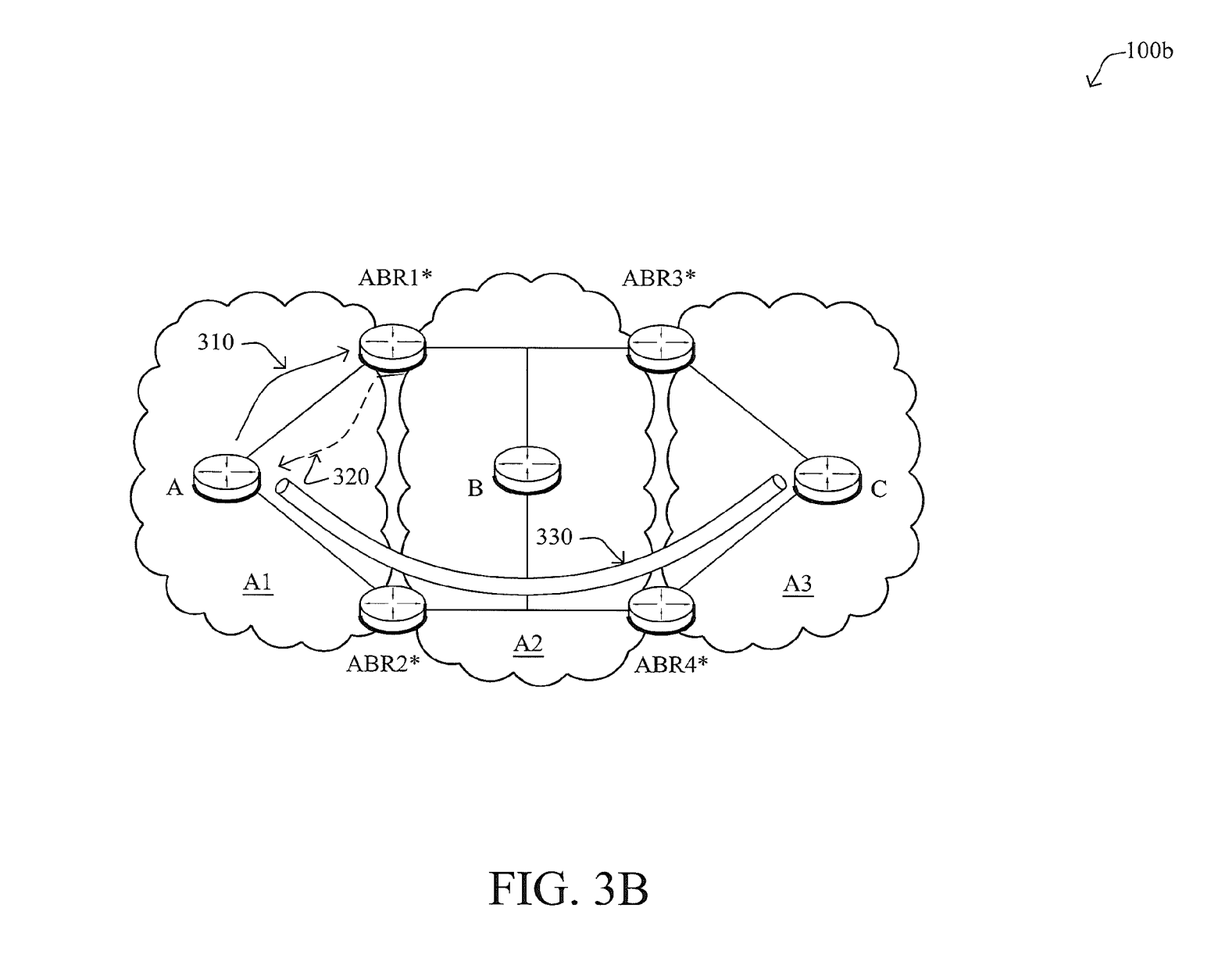

FIGS. 3A-3B illustrate simple examples of PCE-based tunnel computation in the networks 100a and 100b of FIGS. 1A-1B, respectively. In particular, assume in each instance that LSR A, acting as a PCC, requests, from a local PCE (e.g., ASBR1* or ABR1*, respectively), a tunnel to LSR C. The path computation request 310 results in computation of the path, and a path computation response 320 is returned to the head-end LSR A. The tunnel 330 may then be established, accordingly. (Note that for inter-domain computation, the local PCE may act as a PCC to other PCEs in other domains, as mentioned above.) Note further that while PCEs are particularly useful for inter-domain path computation, the techniques herein are not limited to inter-domain path computation, and may, in fact, be used for intra-domain path computation as well.

In PCE-based networks deployed so far, PCEs have been stateless: LSPs were computed by the PCE according to the Traffic Engineering Database (TED) fed in most cases by the routing protocol (ISIS or OSPF, more recently potentially using BGP) without requiring any state maintenance. Although the PCE architecture did refer to the potential use of stateful PCEs as a potentially more optimal model that would keep track of all LSPs states in the network when computing LSPs, the model was seen to be quite complex in terms of signaling, states maintenance, etc. with a number of very challenging issues.

It became apparent that stateful PCE was the solution of choice for several applications such as inter-layer optimizations or global optimization, but only recently did the number of use cases grow significantly considering increased requirements for advanced optimization of bandwidth resources. To that end, stateful PCEs have been implemented, and a stateful PCE draft standard was adopted as the IETF Working Document mentioned above entitled "PCEP Extensions for Stateful PCE", which specifies several new PCEP messages, allowing PCC to update the PCE on their LSP states (PCRpt messages), control LSP delegation (ability for the PCE to remotely control an LSP) and for the PCE to send LSP requests to PCC to learn states (PCUpd messages). As defined in the above document, a function can be initiated either from a PCC towards a PCE (C-E) or from a PCE towards a PCC (E-C). The new functions are:

Capability negotiation (E-C,C-E): Both the PCC and the PCE must announce during PCEP session establishment that they support PCEP Stateful PCE extensions defined in this document;

LSP state synchronization (C-E): After the session between the PCC and a stateful PCE is initialized, the PCE must learn the state of a PCC's LSPs before it can perform path computations or update LSP attributes in a PCC;

LSP Update Request (E-C): A PCE requests modification of attributes on a PCC's LSP;

LSP State Report (C-E): A PCC sends an LSP state report to a PCE whenever the state of an LSP changes; and LSP control delegation (C-E,E-C): A PCC grants to a PCE the right to update LSP attributes on one or more LSPs; the PCE becomes the authoritative source of the LSP's attributes as long as the delegation is in effect; the PCC may withdraw the delegation or the PCE may give up the delegation.

Stateful PCEs are slated to play a major role in future tunnel-enabled network architectures. Though the use of stateful PCEs is intended to solve a wide range of problems, they also bring a number of hard technical issues, including, but not limited to:

1) There are a number of situations where a PCE may receive a burst of signaling requests in the network, which is in contrast with the distributed nature of CSPF: when performing global reoptimizations, rerouting a large number of LSPs upon a link/node failure (in some networks, a single failure may lead to tens of thousands of LSP failures).

2) State maintenance is another critical issue. Stateful PCEs are required to maintain LSP states. When recomputing an LSP, this may first require displacing other LSPs in the network, leading to a very large number of signaling exchanges in the network.

3) Scaling of the overall architecture: attempts have been made to scale the stateful PCE architecture by distributing computation among several PCEs and allowing for inter-PCE communication when performing parallel computations of LSPs. These models have shown very limited scaling due to the number of signaling exchanges between PCEs (similar to IPCs between CPU in massive parallel computing issues).

4) PCE failure during operation of maintenance, which is not an issue when the PCE is stateless. Unfortunately, the issue is significantly more complex when the PCE fails during a maintenance operation (for example, when some LSPs have been updated and the PCE fails before reaching other head-ends and notifying them of an LSP path change that is required for the other LSPs to be routed in the network), thus leaving the network in a very unstable/unknown state.

As mentioned, one of the major challenges of stateful PCE lies in the signaling churn and state maintenance in the network, which may be a limiting factor of such an architecture. In order to limit the amount of OSPF/ISIS LSA flooding so as to update the TED (Traffic Engineering Database), Traffic Engineering keeps track of reserved bandwidth on each link using fixed configurable and non-linear thresholds. For each link, the exact amount of reserved bandwidth is recorded and when a threshold is crossed, a new LSA is flooded updating the TED on all routers. These thresholds are generally non-linear, and closer to each other as the level of booking increases (for example, on a 10M link, the first threshold is 5M, 8M, 9M, 9.7, 9.8, 9.9). The idea of closer thresholds as we get closer to 100% of the bandwidth is that there is a need achieve a greater accuracy of the bandwidth booked since the risk of call set-up failure increases.

The use of thresholds for bandwidth booking states is a requirement to preserve the scalability of the routing protocol. On the other hand, when bandwidth booking is too coarse, this unavoidably leads to a high rate of call signaling failures. While this is generally not a major issue with distributed CSPF, this quickly leads to unsolvable problems with stateful PCEs. Indeed, when an LSP is computed by the stateful PCE, the path is provided to the PCC, that signals the LSP (while bandwidth is held temporarily on the PCE as it waits for reservation confirmations by the requestor, e.g., a PCUpd message). Call set-up failures in a stateful PCE environment imply that the PCC informs the stateful PCE of a call set-up failure, a local TED update is completed by the PCE releasing the previously booked bandwidth, followed by a second computation of the LSP after waiting for the TED update by the IGP or by other means. This shows that inaccuracy of the TED quickly becomes a limiting factor of stateful PCE architectures.

Dynamic Triggering of Routing Advertisements

The techniques herein propose a dynamic scheme for bandwidth booking thresholds that limit call set-up failures, thus increasing stateful PCE scalability. In particular, the techniques herein determine an appropriate set of thresholds used to trigger a routing update of the booking levels on various levels by monitoring the rate of call set-up failures, thus controlling the rates at which routing updates take place while minimizing call failure rates. For instance, the illustratively specified mechanisms described herein may comprise monitoring the call set-up failure rates, reporting the rate to the PCCs which relay the information to the PCE(s), which can in turn dynamically adjust the bandwidth booking threshold schemes for each link in the network in light of the routing advertisement flooding rates.

Specifically, according to one or more embodiments of the disclosure as described in detail below, a device (e.g., a path computation element, PCE) monitors a tunnel set-up failure rate within a computer network, and determines whether to adjust an accuracy of routing information based on the tunnel set-up failure rate. For instance, the tunnel set-up failure rate being above a first threshold indicates a need for greater accuracy. The tunnel rate being below a second threshold, however, indicates a need for fewer routing updates. In response to the tunnel set-up failure rate being above the first threshold or below the second threshold, the device may then instruct one or more routers to shorten or lengthen (respectively) their routing update interval in the computer network.

Illustratively, the techniques described herein may be performed by hardware, software, and/or firmware, such as in accordance with the PCE/PCC process 248, which may contain computer executable instructions executed by the processor 220 to perform PCE/PCC functions relating to the techniques described herein (depending upon whether the acting device is a PCE or a PCC), e.g., in conjunction with routing process 244. For example, the techniques herein may be treated as extensions to conventional protocols, such as various PCE/PCC protocols (e.g., stateful PCE/PCC protocols), and as such, may be processed by similar components understood in the art that execute those protocols, accordingly.

Notably, in this instance, a non-PCE/PCC device, e.g., an LSR, may also be configured to operate according to an illustrative PCE/PCC process 248, e.g., to perform the actions in conjunction with a PCE as described herein.

Figure 4:
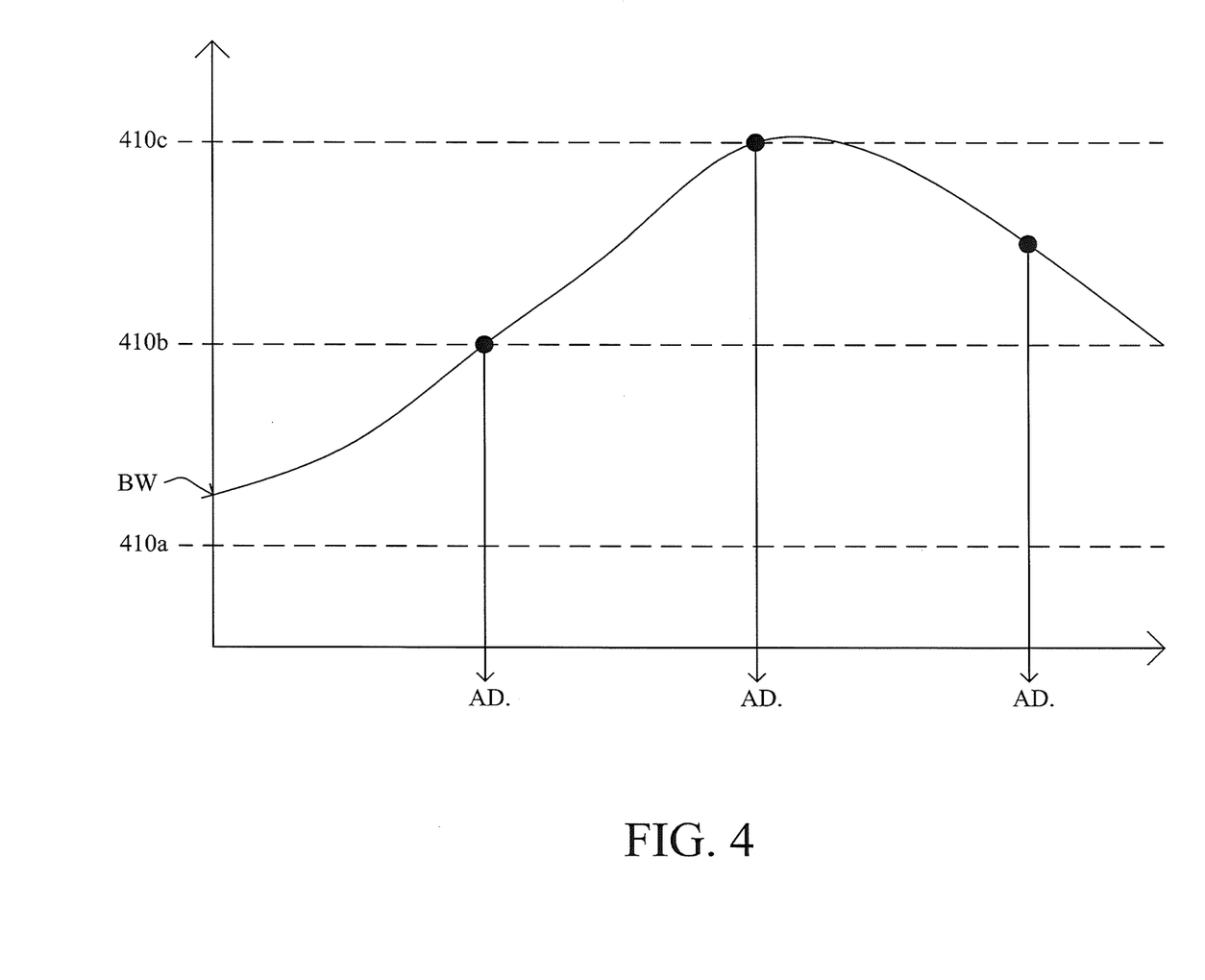
FIGS. 4-6 illustrate examples of dynamic routing update thresholds.

Operationally, one component of the techniques herein may generally initialize routers (LSRs) in the network with a default configuration of thresholds (called "set(1)", where set(1) is the set of threshold for the link "1") upon which a routing update or advertisement is triggered. In one embodiment, the thresholds are identical for all links in the network. Note that in current implementations of MPLS TE, a set of thresholds is statically configured by the network administrator, such that for each link, a set of thresholds is specified <T1, T2, . . . , Tn> where, often, |Ti−Tj|<|Tk−Tl| if |i−j|<|k−l|. FIG. 4 illustrates an example of such thresholds 410 (410a-410c), where a level of bandwidth utilization (or bandwidth availability, other resources, etc.) may cross various thresholds over time, triggering an advertisement ("Ad") of routing information into the network.

Figure 5:
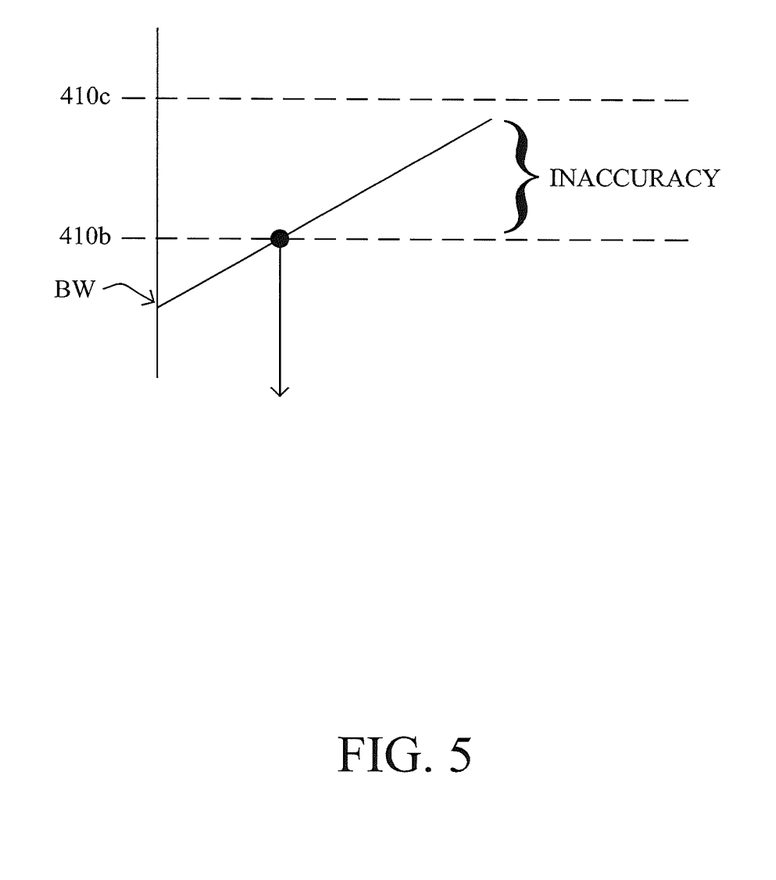

Upon receiving an RSVP-TE Path message, each node along the path of the tunnel (LSP) checks the requested bandwidth against the available bandwidth for the tunnel. If the request cannot be satisfied, the node sends a Path Error message to the head-end and triggers a routing update (an LSA update). In accordance with the embodiments herein, the signaling message (Path Error) is expanded to inform the head-end of the amount (e.g., percentage) of bandwidth by which the request could not be satisfied so as to provide an estimation of the level of inaccuracy of the bandwidth booking tracking based on the multi-threshold mechanism noted in FIG. 4. In particular, with reference to FIG. 5, an expanded view of thresholds 410b and 410c of FIG. 4 is shown, where it can be seen how a sufficient level of inaccuracy could result between thresholds (and thus, between advertisements/routing updates).

According to the techniques herein the PCEP PCUpd message (specified in draft-ietf-pce-stateful-pce, above) sent by the PCC to the stateful PCE may be extended to incorporate the link ID that is the cause of the tunnel/call setup failure, along with the percentage of bandwidth by which the request could not the satisfied, which serves as an indication of the level of inaccuracy of the bandwidth booking scheme in question, as mentioned. In other words, since the tunnel set-up failure rate herein comprises a number of failures and an amount of resources the failed tunnel requested above available resources at a point of failure, the accuracy is thus based on the number and the amount. As such, the PCUpd message may be extended to indicate such information, accordingly (e.g., where the amount is calculated as one of an average, a median, a mean, a maximum, etc.).

Figure 6:
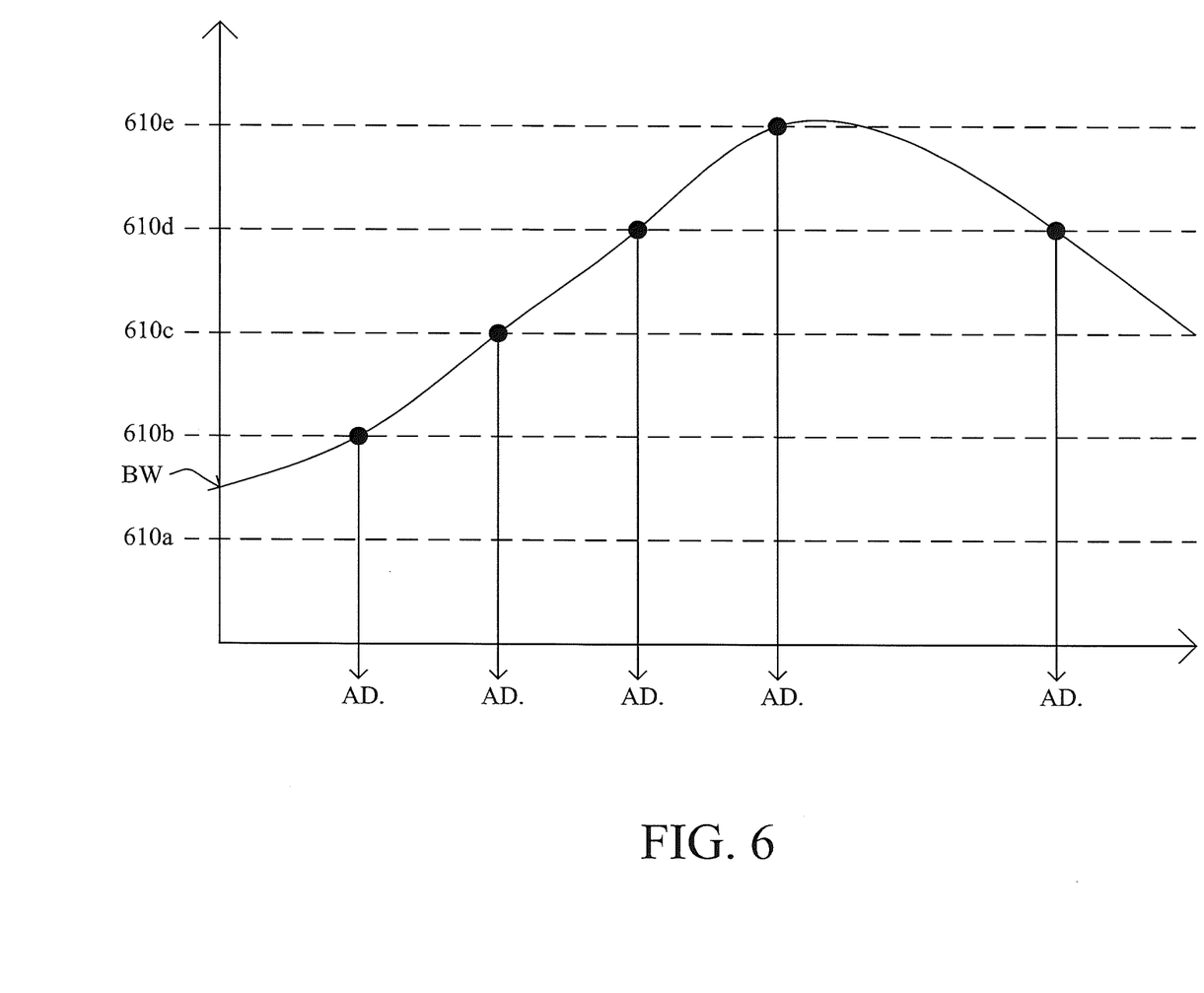

Moreover, according to one or more embodiments herein, another component of the techniques herein is related to the recording of the rates at which call failure occurs for each link in addition to the level of inaccuracy of the bandwidth booking schema in use for these links. Notably, this allows the stateful PCE to dynamically adjust the set of thresholds set(1) for each link (1), increasing the number of thresholds when a higher accuracy is required (thus reducing the call set-up failure) using an iterative algorithm thanks to the observation of the call failure set-up rates for each link in the network. Said differently, the routing update interval may be shortened by adding additional routing change thresholds within closer distances that trigger routing updates. For instance, as shown in FIG. 6, a new set of thresholds 610a-610e are shown that are closer together than thresholds 410a-410c of FIG. 4 above. In this manner, a greater number of routing updates may occur, providing finer-tuned granularity. Note, however, that the techniques herein also provide for reduced granularity (fewer updates) in response to acceptable tunnel set-up failure rates.

To that end, a newly specified message may be sent to each node indicating the newly computed set of thresholds. Elements of set(1) may be dynamically added or removed from each set by observing the tunnel failure (call set-up) rates and the IGP flooding rates should the TED be fed by an IGP. Note that the message may be sent to one or more routers, which may include all routers in the computer network, or else only those offending routers (where monitoring the tunnel set-up failure rate comprises correlating tunnel set-up failures to particular routers in the network). This database of link and set(1) thresholds, along with the number of LSA floodings by the node owning the links in question, may be updated thanks to the observation of the originated LSA and the received set of PCUpd to continuously adapt the set(1) of thresholds for each link in the network. In one embodiment, also, the PCE may apply a safety measure by observing the IGP activity to avoid instructing an offending router to increase the frequency at which it updates routing in case the IGP is already saturated.

Notably, in another embodiment, the PCE, having all the topology and traffic information (including its changes over time), may simulate (e.g., at a lower priority or background task or as an independent server performing backend computation) what is likely to happen in the event of a routing update rate change, and hence derive not only one static set of thresholds but multiple ones, each with an activation policy. That is, the PCE (or other entity) may select specific instructions based on prior simulation using actual network conditions in the computer network.

The activation policy in this illustrative embodiment defines when a "thinner" threshold policy (more frequent updates) is used. As an example, the backend simulation may confirm that the following parameters have clear impact on which set to use: 1) the significant decrease of network capacity during the last 5 to 15 minutes, and 2) the network-wide-average load. Note that the activation leverages network wide intelligence to (the PCE precomputed it, it precomputed the activation policy, the activation policy depends on information readily available in the IGP LSDB and the new TE LSDB extension (remote load) such as to allow a local hop behavior). While these techniques thus leverages the PCE intelligence, it does not require this intelligence at the time of activation of another threshold set.

Figure 7:
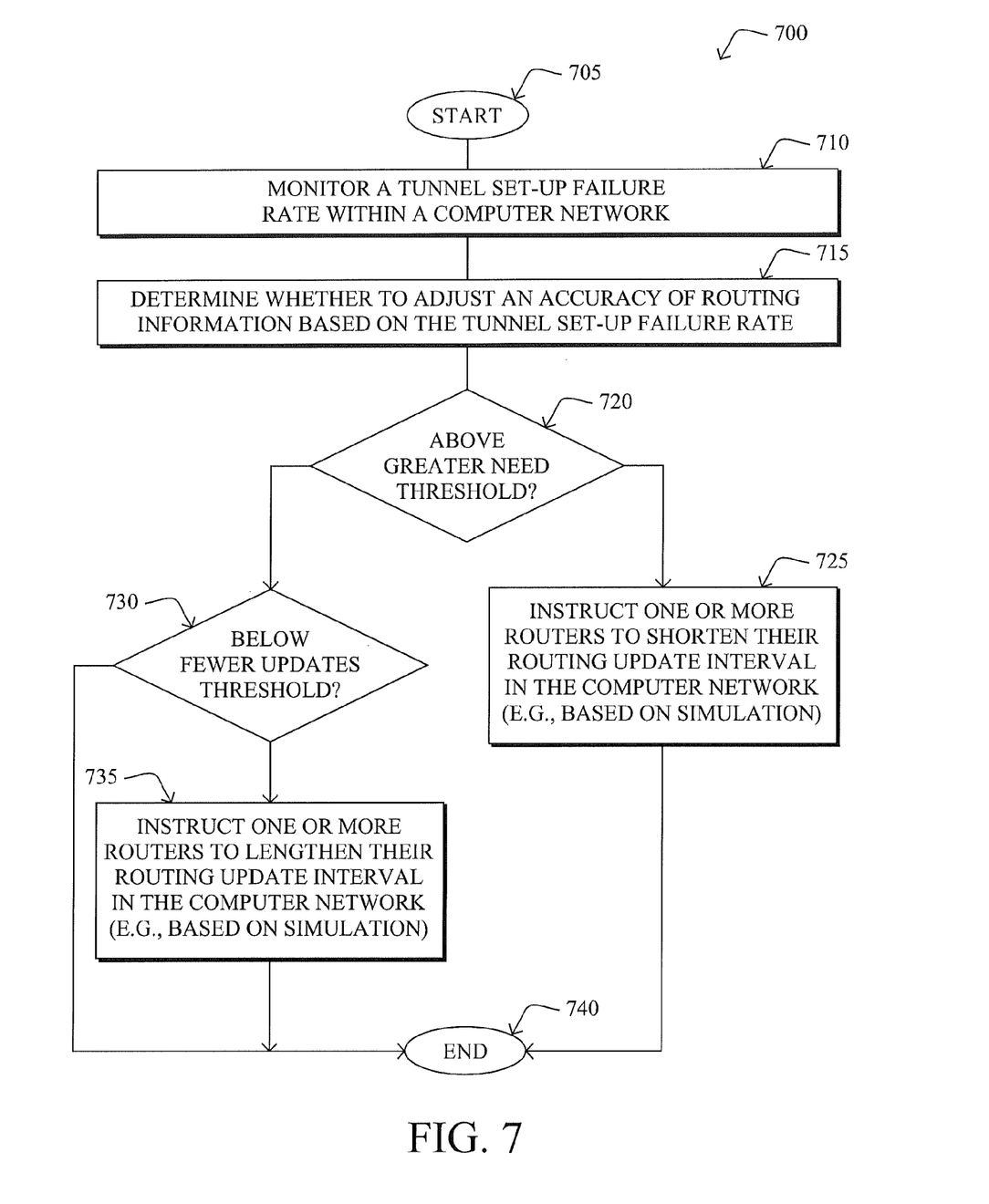
FIG. 7 illustrates an example simplified procedure 700 for dynamically triggered Traffic Engineering routing advertisements in stateful PCE environments, particularly from the perspective of a PCE.

FIG. 7 illustrates an example simplified procedure 700 for dynamically triggered Traffic Engineering routing advertisements in stateful PCE environments in accordance with one or more embodiments described herein, particularly from the perspective of a PCE (or other managerial device in the network). The procedure 700 may start at step 705, and continues to step 710, where, as described in greater detail above, the PCE (or other devices) monitors the tunnel set-up failure rate within a computer network, and determines whether to adjust an accuracy of routing information based on the tunnel set-up failure rate in step 815. In particular, as described above, if in step 720 the tunnel set-up failure rate is above a first threshold (indicating a need for greater accuracy), then in step 725 the PCE may instruct one or more routers to shorten their routing update interval in the computer network. Alternatively, if the tunnel set-up failure rate is below a second threshold in step 730, indicating a need for fewer routing updates, the procedure may instruct one or more routers to lengthen their routing update interval in the computer network in step 735. Notably, as discussed above, such instructions may be based on various degrees of simulation. The procedure 700 illustratively ends in step 740, notably with the option to continue dynamically updating the routing update rate based on the tunnel failure rate.

Figure 8:
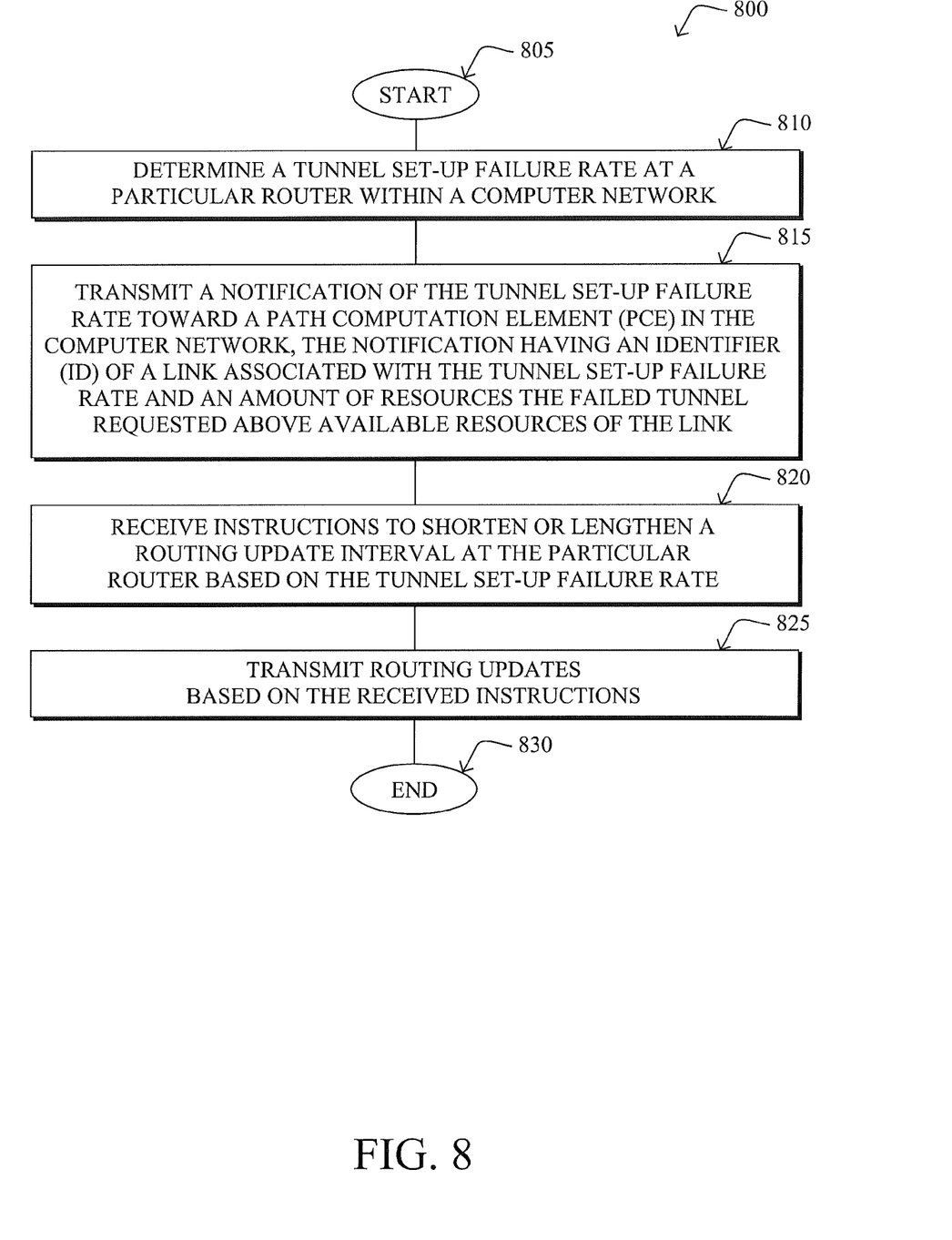
FIG. 8 illustrates an example simplified procedure for dynamically triggered Traffic Engineering routing advertisements in stateful PCE environments, particularly from the perspective of a router/LSR.

FIG. 8 illustrates an example simplified procedure 800 for dynamically triggered Traffic Engineering routing advertisements in stateful PCE environments in accordance with one or more embodiments described herein, particularly from the perspective of a router/LSR. The procedure 800 may start at step 805, and continues to step 810, where, as described in greater detail above, a particular router determines its tunnel set-up failure rates, and transmits a notification of the tunnel set-up failure rate toward a PCE in the computer network in step 815. As noted, the notification may have an ID of a link associated with the tunnel set-up failure rate and an amount of resources the failed tunnel requested above available resources of the link. In response to the tunnel set-up failure rate, the router may eventually receive instructions (at the PCE's discretion, e.g., as described above in FIG. 7 above) in step 720 to shorten or lengthen the routing update interval at the particular router. Accordingly, in step 725, the router may begin transmitting its routing updates based on the received instructions. The procedure 800 illustratively ends in step 830, notably with the option to provide additional notifications and/or receive additional instructions from the PCE (or other device).

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide for dynamically triggered Traffic Engineering routing advertisements in stateful PCE environments. In particular, the techniques herein significantly reduce the number of signaling requests sent to a stateful PCE due to call set-up failures, which are a very frequent issue that may severely impact the overall scalability of stateful PCEs.

While there have been shown and described illustrative embodiments that provide enhanced operation for stateful PCE architectures, it is to be understood that various other adaptations and modifications may be made within the spirit and scope of the embodiments herein. For example, the embodiments have been shown and described herein with relation to MPLS TE-LSPs and other various protocols. However, the embodiments in their broader sense are not as limited, and may, in fact, be used with any function for which a PCE may be responsible, such as other types of tunnels, other types of path computation, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a device, one or more stateful path computation notifications, wherein a particular notification identifies a link for which a tunnel set-up request failed and a percentage of bandwidth by which the request could not be satisfied;
monitoring, by the device, a tunnel set-up failure rate within a computer network by analyzing the received one or more notifications;
determining, by the device, whether to adjust an accuracy between actual and advertised bandwidth booking information in the network based on the tunnel set-up failure rate, wherein the tunnel set-up failure rate being above a first threshold indicates a need for greater accuracy; and
in response to the tunnel set-up failure rate being above the first threshold, instructing, by the device, one or more routers to shorten their routing update intervals during which their bandwidth booking information is advertised in the computer network by causing the one or more routers to use at least one additional bandwidth booking change threshold, wherein the one or more routers advertise their bandwidth booking information in response to a particular bandwidth booking change threshold being crossed, and wherein the at least one additional bandwidth booking change threshold is determined based on the percentage of bandwidth by which the tunnel set-up request could not be satisfied.

2. The method as in claim 1, wherein the tunnel set-up failure rate being below a second threshold indicates a need for fewer routing updates, the method further comprising:
in response to the tunnel set-up failure rate being below the second threshold, instructing the one or more routers to lengthen their routing update interval in the computer network.

3. The method as in claim 1, wherein the one or more routers comprise all routers in the computer network.

4. The method as in claim 1, wherein the one or more routers comprise offending routers in the computer network, wherein monitoring the tunnel set-up failure rate comprises correlating tunnel set-up failures to particular routers in the network.

5. The method as in claim 1, wherein the notification indicates a number of tunnel set-up failures for the link.

6. The method as in claim 5, wherein the number of tunnel set-up failures for the link is calculated as one of an average, a median, a mean, and a maximum.

7. The method as in claim 1, wherein a particular bandwidth booking change threshold corresponds to a percentage of booked bandwidth.

8. The method as in claim 1, further comprising:
observing, by the device, routing update activity in the computer network during which bandwidth booking information is advertised; and
preventing, by the device, a shortened routing update interval when routing updates are already above a threshold amount.

9. The method as in claim 1, wherein instructing comprises:
selecting specific instructions based on a prior simulation that uses actual network conditions in the computer network.

10. An apparatus, comprising:
one or more network interfaces to communicate within a computer network;
a processor coupled to the network interfaces and adapted to execute one or more processes; and
a memory configured to store a process executable by the processor, the process when executed operable to:
receive one or more stateful path computation notifications, wherein a particular notification identifies a link for which a tunnel set-up request failed and a percentage of bandwidth by which the request could not be satisfied;
monitor a tunnel set-up failure rate within a computer network by analyzing the one or more received notifications;
determine whether to adjust an accuracy between actual and advertised bandwidth booking information in the network based on the tunnel set-up failure rate, wherein the tunnel set-up failure rate being above a first threshold indicates a need for greater accuracy; and
instruct one or more routers to shorten their routing update intervals during which their bandwidth booking information is advertised in the computer network in response to the tunnel set-up failure rate being above the first threshold by causing the one or more routers to use at least one additional bandwidth booking change threshold, wherein the one or more routers advertise their bandwidth booking information in response to a particular bandwidth booking change threshold being crossed, and wherein the at least one additional bandwidth booking change threshold is determined based on the percentage of bandwidth by which the tunnel set-up request could not be satisfied.

11. The apparatus as in claim 10, wherein the tunnel set-up failure rate being below a second threshold indicates a need for fewer routing updates, wherein the process when executed is further operable to:
instruct the one or more routers to lengthen their routing update interval in the computer network in response to the tunnel set-up failure rate being below the second threshold.

12. The apparatus as in claim 10, wherein the one or more routers comprise all routers in the computer network.

13. The apparatus as in claim 10, wherein the one or more routers comprise offending routers in the computer network, wherein monitoring the tunnel set-up failure rate comprises correlating tunnel set-up failures to particular routers in the network.

14. The apparatus as in claim 10, wherein the notification indicates a number of tunnel set-up failures for the link.

15. The apparatus as in claim 10, wherein the number of tunnel set-up failures for the link is calculated as one of an average, a median, a mean, and a maximum.

16. The apparatus as in claim 10, wherein a particular booking change threshold corresponds to a percentage of booked bandwidth.

17. The apparatus as in claim 10, wherein the process when executed to instruct is further operable to:
select specific instructions based on a prior simulation that uses actual network conditions in the computer network.

18. A method, comprising:
determining a tunnel set-up failure rate at a particular router within a computer network;
transmitting, by the router, a stateful path computation notification that includes the tunnel set-up failure rate toward a path computation element (PCE) in the computer network, the notification having an identifier (ID) of a link associated with the tunnel set-up failure rate and an amount of bandwidth the failed tunnel requested above available bandwidth of the link;

receiving instructions at the router to shorten a routing update interval at the particular router based on the tunnel set-up failure rate during which the router advertises bandwidth booking information, wherein the instructions cause the router to shorten the routing update interval by using at least one additional bandwidth booking change threshold, and wherein the at least one additional bandwidth booking change threshold is determined based on the amount of bandwidth the failed tunnel requested above the bandwidth of the link; and transmitting routing updates based on the received instructions that include the bandwidth booking information, in response to a particular bandwidth booking change threshold being crossed.

19. The method as in claim 18, further comprising:

receiving instructions to lengthen the routing update interval at the particular router based on the tunnel set-up failure rate; and transmitting routing updates based on the received instructions.

20. An apparatus, comprising:

one or more network interfaces to communicate as a particular router within a computer network;

a processor coupled to the network interfaces and adapted to execute one or more processes; and a memory configured to store a process executable by the processor, the process when executed operable to:

determine a tunnel set-up failure rate at the particular router within a computer network;

transmit a stateful path computation notification that includes the tunnel set-up failure rate toward a path computation element (PCE) in the computer network, the notification having an identifier (ID) of a link associated with the tunnel set-up failure rate and an amount of bandwidth the failed tunnel requested above available bandwidth of the link;

receive instructions to one of either shorten or lengthen a routing update interval at the particular router based on the tunnel set-up failure rate during which the router advertises bandwidth booking information, wherein the instructions cause the router to shorten the routing update interval by using at least one additional bandwidth booking change threshold, and wherein the at least one additional bandwidth booking change threshold is determined based on the amount of bandwidth the failed tunnel requested above the bandwidth of the link; and transmit routing updates based on the received instructions that include the bandwidth booking information, in response to a particular bandwidth booking change threshold being crossed.

* * * * *